United States Patent [19]

Reed et al.

[11] Patent Number: 5,273,126
[45] Date of Patent: Dec. 28, 1993

[54] TRACKLAYING VEHICLES

[75] Inventors: John N. Reed, Flitwick; John Knox, Luton, both of England

[73] Assignee: British Techology Group Ltd., London, England

[21] Appl. No.: 752,599

[22] PCT Filed: Dec. 13, 1990

[86] PCT No.: PCT/GB90/01949
§ 371 Date: Aug. 12, 1991
§ 102(e) Date: Aug. 12, 1991

[87] PCT Pub. No.: WO91/08941
PCT Pub. Date: Jun. 27, 1991

[30] Foreign Application Priority Data

Dec. 13, 1989 [GB] United Kingdom ............ 8928188
Jun. 29, 1990 [GB] United Kingdom ............ 9014501

[51] Int. Cl.⁵ .................................. B62D 55/04
[52] U.S. Cl. ........................... 180/9.21; 180/9.26; 180/9.5; 180/9.54; 305/22; 305/24; 305/27
[58] Field of Search ............ 180/9.5, 9.21, 9.26, 180/9.28, 9.3, 9.34, 9.42, 9.52, 9.54; 305/21, 22, 24, 27, 28

[56] References Cited

U.S. PATENT DOCUMENTS

| 1,368,652 | 2/1921 | Pennington et al. | 305/22 |
| 2,051,496 | 8/1936 | Sarrazin | 180/9.3 |
| 3,532,397 | 10/1970 | Johnson | 305/27 |
| 3,994,352 | 11/1976 | Siorek | 180/9.1 |
| 4,305,476 | 12/1981 | Blass et al. | 180/9.54 |
| 4,313,516 | 2/1982 | Terry | 180/9.5 |
| 4,681,177 | 7/1987 | Zborowski | 180/9.52 |

FOREIGN PATENT DOCUMENTS

| 0610603 | 12/1960 | Canada | 180/9.26 |
| 141265 | 9/1984 | European Pat. Off. | |
| 0302776 | 2/1989 | European Pat. Off. | |
| 0362062 | 4/1990 | European Pat. Off. | 180/9.52 |
| 0446186 | 9/1991 | European Pat. Off. | 305/22 |
| 577615 | 9/1924 | France | |
| 973693 | 2/1951 | France | |
| 156566 | 11/1921 | United Kingdom | |
| 611543 | 11/1948 | United Kingdom | |
| 809359 | 2/1959 | United Kingdom | |
| 0925032 | 5/1963 | United Kingdom | 180/9.21 |

Primary Examiner—Margaret A. Focarino
Assistant Examiner—A. M. Boehler
Attorney, Agent, or Firm—Cushman, Darby & Cushman

[57] ABSTRACT

A suspended-track tracklaying vehicle 8 (FIG. 1) comprises an endless ground-engaging track 12, a drive sprocket 20 which remains positionally fixed relative to the vehicle body, a rear idler 14 and track-engaging ground rollers 16 which move with the swing link/air-spring suspension 28,30, and a compensator idler 18 mounted for substantially linear movement under the action of one or more spring-loaded compression units 38 acting between the compensator idler and the vehicle body.

9 Claims, 5 Drawing Sheets

TRACKLAYING VEHICLES

The present invention relates to tracklaying vehicles and in particular, but not exclusively, to tracklayer tractors.

Hitherto, the track-engaging ground rolls of such tractors have been carried on rigidly-mounted axles and any changes in track length due to track wear or local deflections between idlers have been minimal and easily accommodated by the usual spring idler units. Such tractors will hereinafter be referred to as "fixed axle" tractors.

Although known tracklayer tractors have improved grip and reduced soil compaction compared with known four-wheel tractors, they share the common disadvantage of all fixed axle vehicles that their top speeds are in practice restricted by the amount of vibration that the vehicle, and its driver, can withstand. This is particularly disadvantageous when speed is of the essence, e.g. when taking the tractor from site to site along a public highway.

This disadvantage may be overcome by fitting the tracklaying vehicle with some form of suspension system. One of the main problems to be overcome with those track suspension systems which operate by allowing relative movements of the track engaging rotating elements, is the need to provide a controlled (preferably constant) track tension for the full range of suspension travel.

For example when a conventional swing link suspension system is deflected, the length of track required to encompass the track engaging rotating elements changes. Since the actual track length cannot be altered a compensating device must be incorporated which can adjust its position so as to maintain track tension and take up track slack. This latter can typically be 4% or so of the actual track length. The usual fixed-axle tractor spring idler units referred to above are quite unable to provide the range of idler movement to take up this level of track slack while still maintaining a constant track tension. Overcoming the problem by increasing the size of the conventional spring units would require the use of such extremely large/heavy springs that the solution would be impractical for most applications.

An object of the present invention is to provide a suspended-track tracklaying vehicle in which the problems discussed above are overcome or at least significantly reduced.

According to the present invention, a suspended-track tracklaying vehicle (e.g. a tracklayer tractor), comprises an endless track, a movable sub-frame supported by track-engaging elements backing the ground-engaging portion of the track, a drive sprocket or the like which remains positionally fixed relative to the vehicle body, and a track-engaging compensator idler mounted for movement, preferably substantially straight line movement, relative to the sub-frame under the action of one or more spring-loaded compression units acting between the compensator idler and the vehicle body.

Conveniently, the line of action of the or each compression unit lies in or close to a diametral plane of the compensator idler and is connected with an axial support for the compensator idler via a slide unit extending in said plane between said axial support and the distal end of the compression unit.

Conveniently, the slide unit is displaceable only in a substantially horizontal direction relative to the sub-frame.

Conveniently, the substantially linear path of the compensator idler lies within an angle range of plus or minus 20° (preferably 0°) to the horizontal.

Conveniently, the suspension system comprises a parallel swing link mechanism adapted to control the movement of a subframe carrying the track-engaging ground rolls and the compensator idler mounting.

Conveniently, the track wraps around a bottom rear idling support with an angle of wrap which is bisected by an associated link of the swing link mechanism.

Conveniently, in this latter case, the adjacent ends of the compression unit and the nearer swing link are secured to the vehicle body in substantially coaxial fashion.

Conveniently, the line of action of the compression unit relative to the adjacent part of the vehicle body against which it acts, lies between the horizontal and 30° below the horizontal (as indicated by angle $\alpha$ in the drawings referred to below).

Conveniently, the suspension system includes an airspring and damper arrangement adapted to control the operating characteristics of the suspension system.

The invention also includes a suspended-track assembly (with some or all of the various characteristics listed above) designed so that the track-driving sprocket of the assembly can be fitted in place of the normal rear wheel of a four wheel tractor.

By way of a practical example, a medium sized agricultural tractor fitted with rubber half track units in accordance with the present invention, should typically be capable of road speeds of up to 30 km/hour with terminal spring deflections in the spring loaded compensator unit of not more than about 10 mm.

An embodiment of the invention will now be described, by way of example only, with reference to the accompanying drawings in which.

Figure 1:
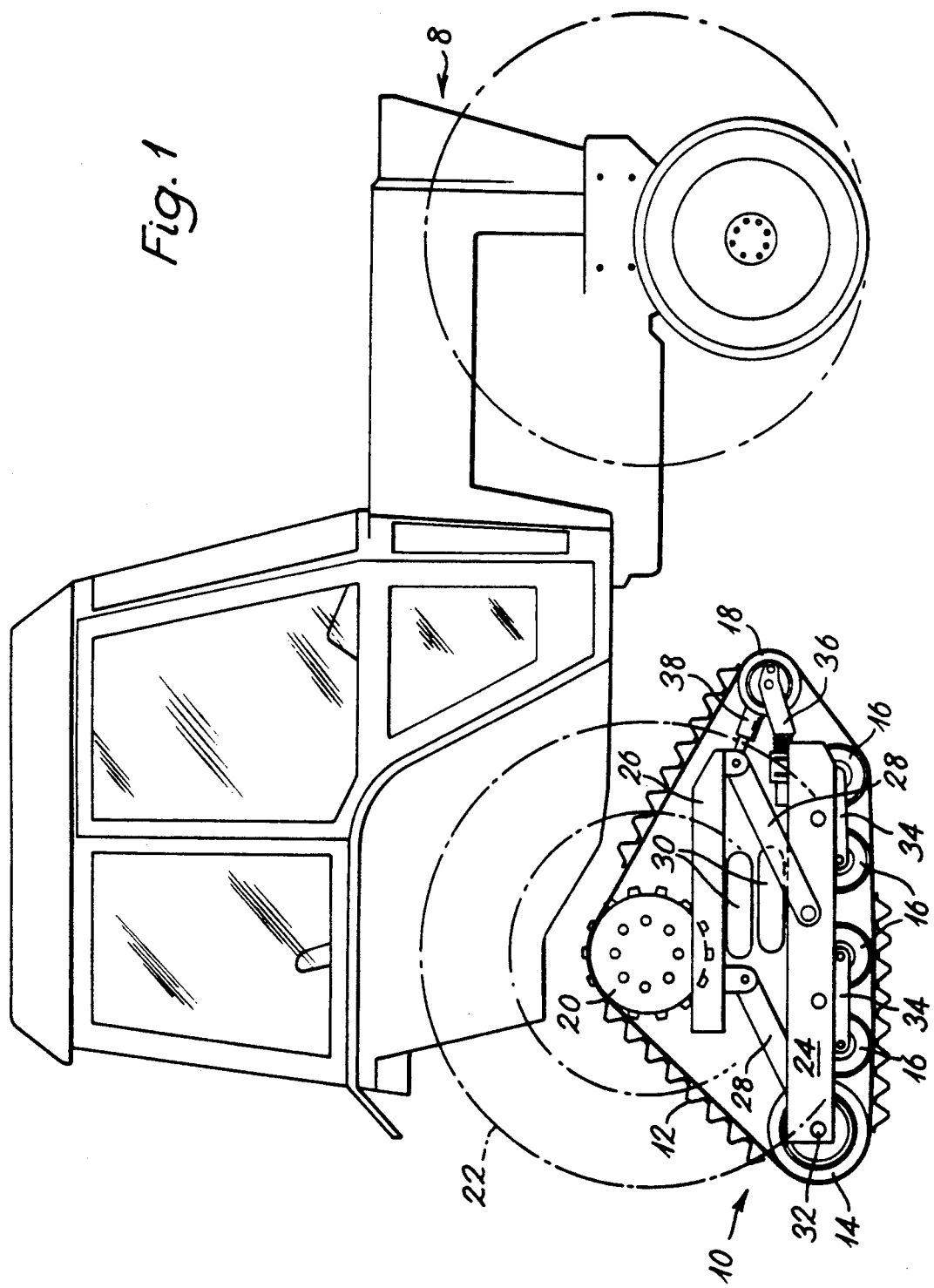
FIG. 1 shows a side view of a tracklayer tractor incorporating a suspended track assembly in accordance with a first embodiment of the present invention.

Thus referring first principally, but not exclusively, to FIG. 1 of the drawings, this depicts a tractor 8 which is in part supported on a pair of half-track assemblies 10, each constructed in accordance with the present invention.

In essence, as before, each assembly 10 comprises an endless rubber track 12 held in the desired configuration by a rear idler 14, two pairs of ground rollers 16, a front compensator idler 18 and a drive sprocket 20 which is mounted on the rear axle of the tractor in place of the usual land wheel 22.

As may be seen from FIG. 1, the ground rollers and the idlers are all in some way supported from a single sub-frame 24 which is itself supported from the vehicle body frame 26 by a swing link/air-spring suspension 28,30.

Thus the rear idler 14 is mounted directly on the sub-frame using the lower support axle 32 for the rear links 28, the ground rollers 16 are pivotally mounted there by means of rocking bogies 34, and the compensator idler 18 is displaceably connected therewith by means of a composite slide link 36.

Preferably, the line of action of the back swing links 28 are arranged to substantially bisect the angle of track wrap around the rear idler 14 in order to minimize the potential for ground-induced traction forces to influence the suspension system kinematics.

To take up slack and maintain a reasonably constant track tension, a pair of outwardly sprung compression units 38 (one on each side of link 36) acts between the front idler 18 and the top support axle for the foremost swing links 28.

With particular reference now to the later Figures, it will be seen that each slide link 36 comprises three items—part 40, clevis plates 57 and axle block 59.

Figure 4:
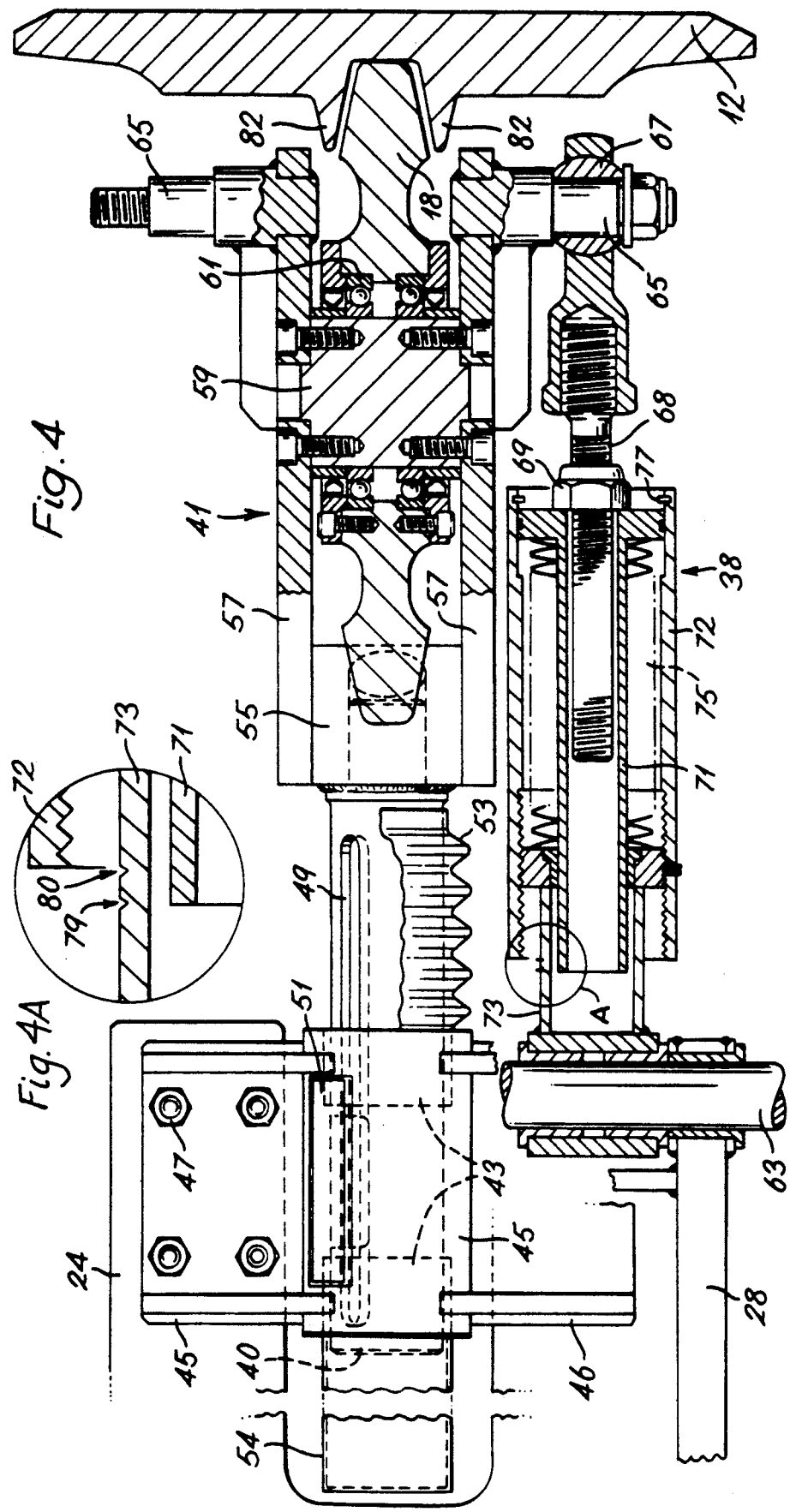
FIG. 4 shows a detail of the same assembly on a still larger scale.

As best seen from FIG. 4, the rearmost part 40 slides within support bearings 43 which are housed in a separate unit 45 bolted to the sub-frame 24 as illustrated at 47.

To prevent rotation, a key-way 49 in slide part 40 is engaged by a key 51 fixed in unit 45. A gaiter 53 and cover 54 protect the key-way 49 against the ingress of dirt. Alternatively a wiper seal may be used in conjunction with a rearranged guide slot.

In alternative designs (not shown), the slide part 40 could be splined or square-sectioned etc. to prevent rotation instead of using the illustrated key arrangement.

Figure 2:
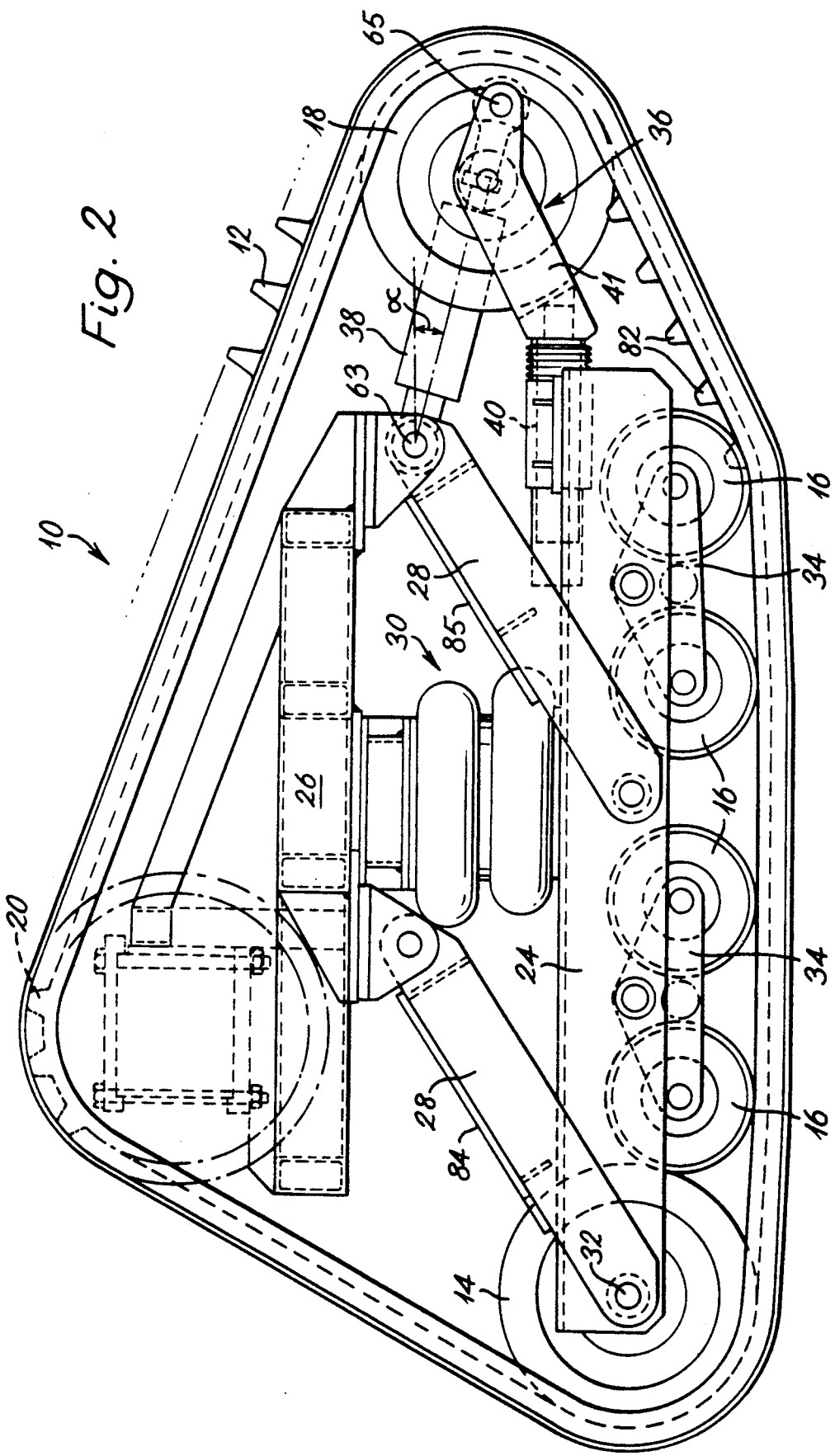
FIGS. 2 and 3 show side and plan views of the track assembly of FIG. 1 on a larger scale.

At its front end, the slide part 40 is welded to a block 55. Secured to this block are the two clevis plates 57, each of a shallow swan-neck profile as illustrated in FIG. 2. Bolted between these plates is the fixed axle block 59 carrying a bearing 61 for the compensator idler 18.

Of the two compression units 38 which will be present for each compensator idler in the assembly, only the "right-hand" unit (when looking forwardly) is shown in FIG. 4 while in the remaining Figures this particular compression unit is omitted (for clarity) and the left-hand unit is shown instead. As will be seen e.g. from FIG. 2 and FIG. 4, the rear ends of units 38 are pivoted about the cross shaft (63) for the foremost swing links 28. The foremost ends of units 38 are pivoted about two stub shafts 65 which project outwardly from the downwardly inclined portions of the clevis plates 57.

The position of the points where units 38 attach to slide link part 41 has been carefully chosen, given the rear connection point for the compression units, by having the clevis plates extend forwardly of the rotation axis for idler 18 in a direction which is substantially parallel with the deflection axes of compression units 38. The effect of this is to minimize the deflections of units 38 that will occur with full movement of the suspension 28,30.

In more detail, each compression unit 38 is made up of two half assemblies. The first half assembly consists of a spherical joint 67, a threaded rod 68, and a nut 69, of which the spherical joint and threaded rod are permanently fixed together while the nut 69 is used when fitting the completed spring assembly to the track as will be described below.

The second half assembly consists of a spring guide 71, an outer sleeve 72, spring cap 73 and a stack of disc springs 75.

To assemble the various items of this second half assembly spring guide 71 is inserted into sleeve 72 and a circlip or snap ring 77 is fitted. Next, the disc springs 75 are slid down the barrel of spring guide 71 and the spring cap 73 is screwed into sleeve 72, compressing and thus preloading the spring stack against the circlip 77 until a first notch 79 on spring cap 73 is flush with the end of sleeve 72.

The first half spherical joint assemblies 67,68 are then mounted on the stub shafts 65 of slide unit 41. Next the slide unit 41 and spherical joint assemblies 67,68 are respectively inserted into unit 45 and spring sleeves 38 as shown in FIG. 4. To facilitate track fitting, unit 41 is fully retractecd into housing 51, adjusting nuts 69 as necessary, to center the center distance between shafts 65 and 63. The track can then be assembled around the now assembled tensioning idler unit 38.

This unit now has to be adjusted to provide the required track tension. This is achieved by first taking up the track slack by adjustment of nuts 69. Then the outer sleeves 72 of the compression units are rotated until a second notch 80 on spring cap 73 is flush with the end of sleeve 72. The load from disc springs 75 will now be transferred from circlip or snap ring 77 to nut 69 as shown in FIG. 4. The spacing between notches 79 and 80 (approximately 10 mm) is designed to be sufficient to allow for the small change in centre distance between nuts 63 and 65 during full suspension movement (plus a clearance). The outer spring sleeve 72, is finally locked to spring cap 73 with a grub screw to prevent rotation in use.

Figure 3:
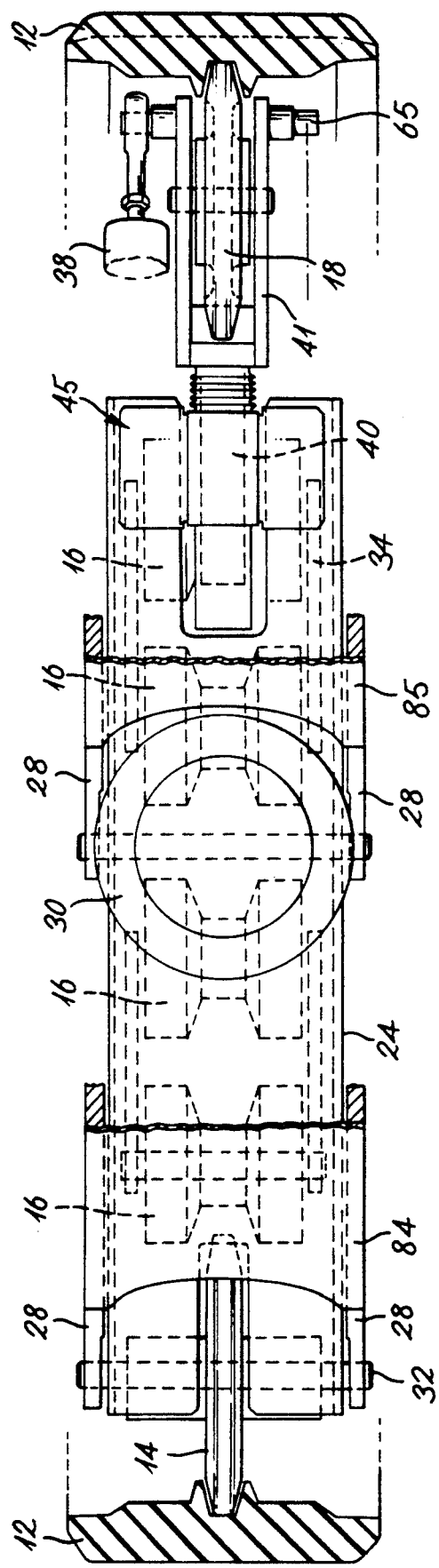

The assembly is completed by the endless rubber track 12 which is provided with two rows of internal teeth 82. As will be clear from FIG. 3, these teeth will be engaged internally by the idlers 14,18 (and drive sprocket 20) and will be engaged externally by the waisted ground support rolls 16. FIG. 3 also shows the shaped bridge-pieces 84,85 by which the swing links 28 are interconnected to improve the rigidity of the system.

Figure 5:
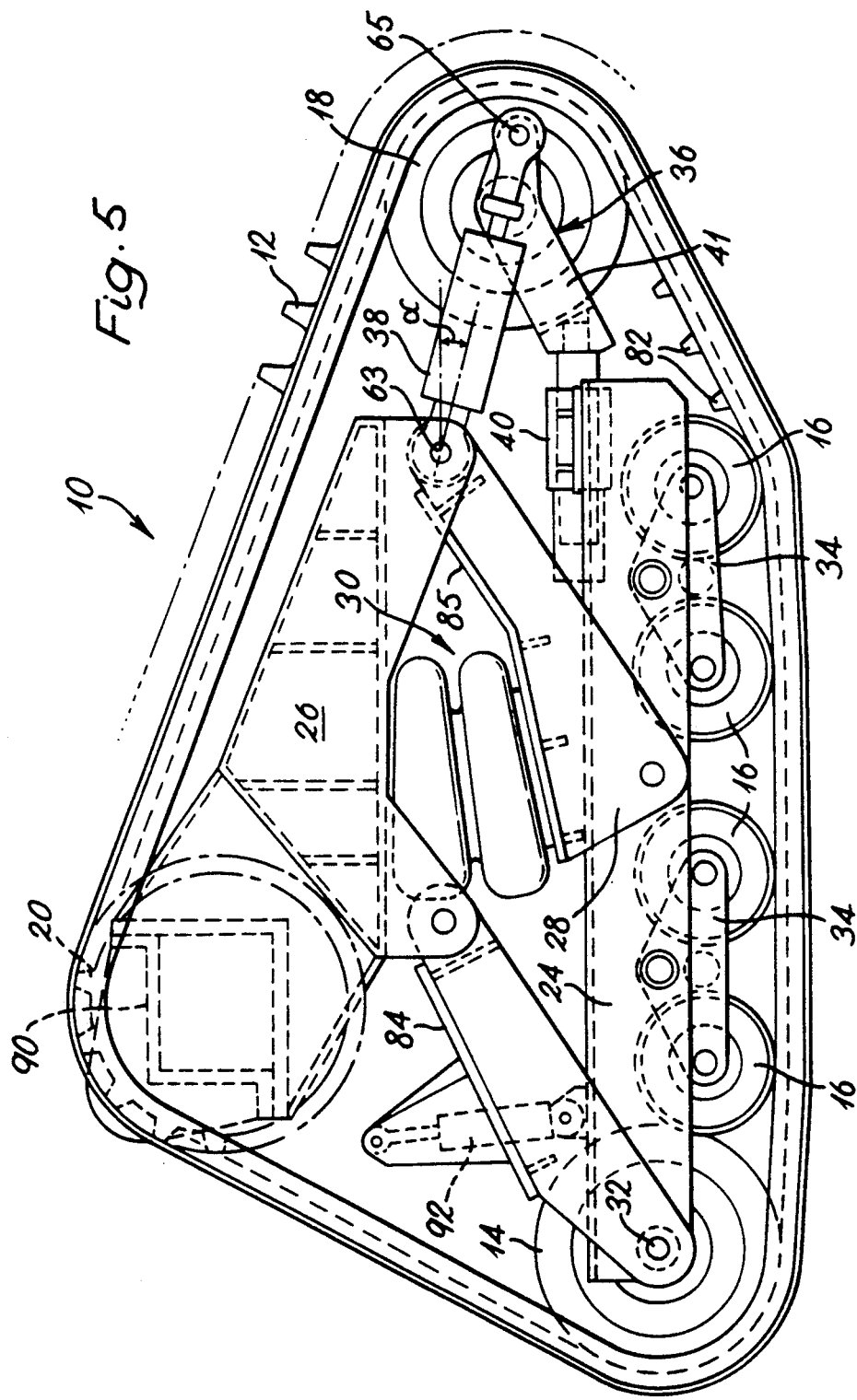
FIG. 5 shows a side view of a suspended-track assembly in accordance with a second embodiment of the present invention.

Referring now to FIG. 5 of the drawings, this depicts one of a pair of half-track assemblies 10, each constructed in accordance with a second embodiment of the present invention for use in place of the rear wheels of a converted tractor (not shown).

The assembly of FIG. 5 has much in common with the first embodiment and the same reference numerals have been used to indicate the same or functionally identical or similar parts occurring in both embodiments.

The principal differences are that in the FIG. 5 embodiment, certain structural parts have been redesigned (e.g. items 26,28,30,84,85); item 30 now acts between item 26 and items 28,85 (instead of between items 26 and 24); frame 26 is clamped on to the rear axle mounting of the tractor by an extension piece 90; and a damper 92 has been added to damp the motion of piece 84 relative to sub-frame 24.

In operation, while the vertical position of compensator idler 18 is dictated by the vertical position of subframe 24, its horizontal position is controlled by compression units 38. Thus, as the vehicle weight changes or an obstacle is encountered, subframe 24 moves up or down under the control of the swing links 28 and the spring 30, and the relative movement between subframe 24 and the vehicle body frame 26 is used by the track compensator mechanism to control the position of front idler 18.

Thanks to the careful positioning of the end points of compression units 38, the movement of idler 18 matches, almost exactly, that required to take up the slack resulting from any suspension movement and the size of the spring required to maintain a low variation in track tension is small and can be easily accommodated.

Typically, with the arrangement as illustrated, a movement of front idler 18 relative to subframe 24 of 106 mm, would require the length of units 38 to change only by some 7 mm, say, to maintain track tension.

Known tractor track systems employ independently sprung idlers and/or ground rolls which are generally costly and difficult to accommodate in the space available, and it is an advantage of the illustrated embodiments of the present invention that compared with such systems, it is a relatively low cost, small space (narrow) structure. Moreover, as the track assemblies of FIGS. 1 to 5 are only supporting one end of the tractor 8, with pitch stability coming from the front wheels of the vehicle, the simple parallel link type suspension system need employ only the single subframe (24) to support the idlers and the ground rolls present. This allows the subframe movement to be utilised advantageously with respect to track length compensation.

Although only a half-track tracklaying vehicle has been illustrated in the drawings, it will readily be understood that the same teaching may be applied to the design of a suitable full-track vehicle with the same basic track assembly characteristics as described above for the half-track vehicle. The invention specifically includes both such vehicles within its ambit as well as suspended track assemblies for use in such vehicles.

Where suspended track assemblies in accordance with the present invention are designed for use with a half-track vehicle, this latter can either be of the rear-wheel drive or four-wheel drive type. In either case, however, the assembly will normally be fitted to replace the rear wheels of the tractor.

We claim:

1. A suspended-track tracklaying vehicle comprising:
a vehicle body portion;
an endless track having a continuous feed ground-engaging portion, and
a suspension system, including:
   a sprung, vertically displaceable sub-frame,
   track-engaging ground rollers mounted on said sub-frame and backing the ground-engaging portion of the track,
   a track-engaging drive means mounted in a positionally fixed relationship to said vehicle body portion,
   a track-engaging idler means mounted on said sub-frame for movement relative to the sub-frame, and
   at least one spring-loaded compression unit acting between the idler means and the vehicle body portion,
   wherein changes in track geometry resulting from vertical displacement of said sub-frame relative to said vehicle body are accommodated by a compensating movement of said idler means relative to said sub-frame; and
   wherein the suspension system further comprises a parallel swing link mechanism for controlling the movement of said sub-frame carrying said track-engaging ground rollers and a mounting for the idler means.

2. A vehicle as claimed in claim 1, wherein the idler means is mounted for substantially straight line movement relative to said sub-frame.

3. A vehicle as claimed in claim 1 or claim 2, wherein a line of action of each compression unit lies proximate to a diametral plane of the idler means and is connected with an axial support for the idler means via a slide unit extending in said plane between said axial support and a distal end of the compression unit.

4. A vehicle as claimed in claim 3, wherein the slide unit is displaceable only in a substantially horizontal direction relative to the sub-frame.

5. A vehicle as claimed in claim 2, wherein the substantially straight line movement of the idler means lies within an angular range of plus and minus 20° to the horizontal.

6. A vehicle as claimed in claim 1 wherein the track wraps around a bottom rear idling support with an angle of wrap which is bisected by an associated link of the swing link mechanism.

7. A vehicle as claimed in claim 1, wherein adjacent ends of the compression unit and the swing link mechanism nearest thereto are secured to the vehicle body in substantially co-axial fashion.

8. A suspended-track tracklaying vehicle comprising:
a vehicle body portion;
an endless track having a continuous feed ground-engaging portion, and
a suspension system, including:
   a sprung, vertically displaceable sub-frame,
   track-engaging elements mounted on said sub-frame and backing the ground-engaging portion of the track,
   a track-engaging drive means mounted in a positionally fixed relationship to said vehicle body portion,
   a track-engaging idler means mounted on said sub-frame for movement relative to the sub-frame, and
   at least one spring-loaded compression unit acting between the idler means and the vehicle body portion,
   wherein changes in track geometry resulting from vertical displacement of said sub-frame relative to said vehicle body are accommodated by a compensating movement of said idler means relative to said sub-frame; and
wherein a line of action of the compression unit relative to an adjacent part of the vehicle body against which it acts, lies between 0° and −30°.

9. A suspended-track tracklaying vehicle comprising:
a vehicle body portion;
an endless track having a continuous feed ground-engaging portion, and
a suspension system, including:
   a sprung, vertically displaceable sub-frame,
   track-engaging elements mounted on said sub-frame and backing the ground-engaging portion of the track,
   a track-engaging drive means mounted in a positionally fixed relationship to said vehicle body portion,
   a track-engaging idler means mounted on said sub-frame for movement relative to the sub-frame, and
   at least one spring-loaded compression unit acting between the idler means and the vehicle body portion,
   wherein changes in track geometry resulting from vertical displacement of said sub-frame relative to said vehicle body are accommodated by a compensating movement of said idler means relative to said sub-frame; and
wherein the suspension system includes an air-spring and damper arrangement adapted to control the operating characteristics of the suspension system.

* * * * *